United States Patent Office 3,343,429
Patented Sept. 26, 1967

3,343,429
LIMITED DIFFERENTIAL MECHANISM
Barry L. Frost, Jackson, Mich., assignor to Clark Equipment Company, a corporation of Michigan
Filed Dec. 27, 1965, Ser. No. 516,276
5 Claims. (Cl. 74—711)

The present invention relates to limited slip differential gearing, and particularly to a differential mechanism employing helical gears in a planetary arrangement.

Conventional differential mechanisms such as those commonly employed for automotive vehicles are designed to allow the driving wheels to rotate at different speeds when the vehicle is making a turn, and they accomplish this function satisfactorily. Such differentials, however, have the drawback of delivering no power to a wheel having traction if the other wheel does not have traction. The invention provides a planetary type differential mechanism utilizing helical gears to develop a lateral or end thrust proportional to the torque, which thrust is employed to decrease the differential action allowed as the torque rises, until the differential is locked. Thus, in case of loss of traction by one wheel, power is delivered to the other wheel. Additionally, the relation between torque and the locking bias may be preselected. At the same time, at relatively low torque, the mechanism of the invention, like conventional differentials, also performs the function of dividing the delivered torque equally between the two wheels.

It is accordingly the primary object of the invention to provide a limited slip differential mechanism which at relatively low torque operates to effect substantially equal devision thereof between the differentially connected shafts, and to effect progressively increasing locking of the differential upon increase in transmitted torque. Thus, in the event of unequal wheel traction, it transmits greater torque to the axle of the wheel having greater traction.

Figure 1:
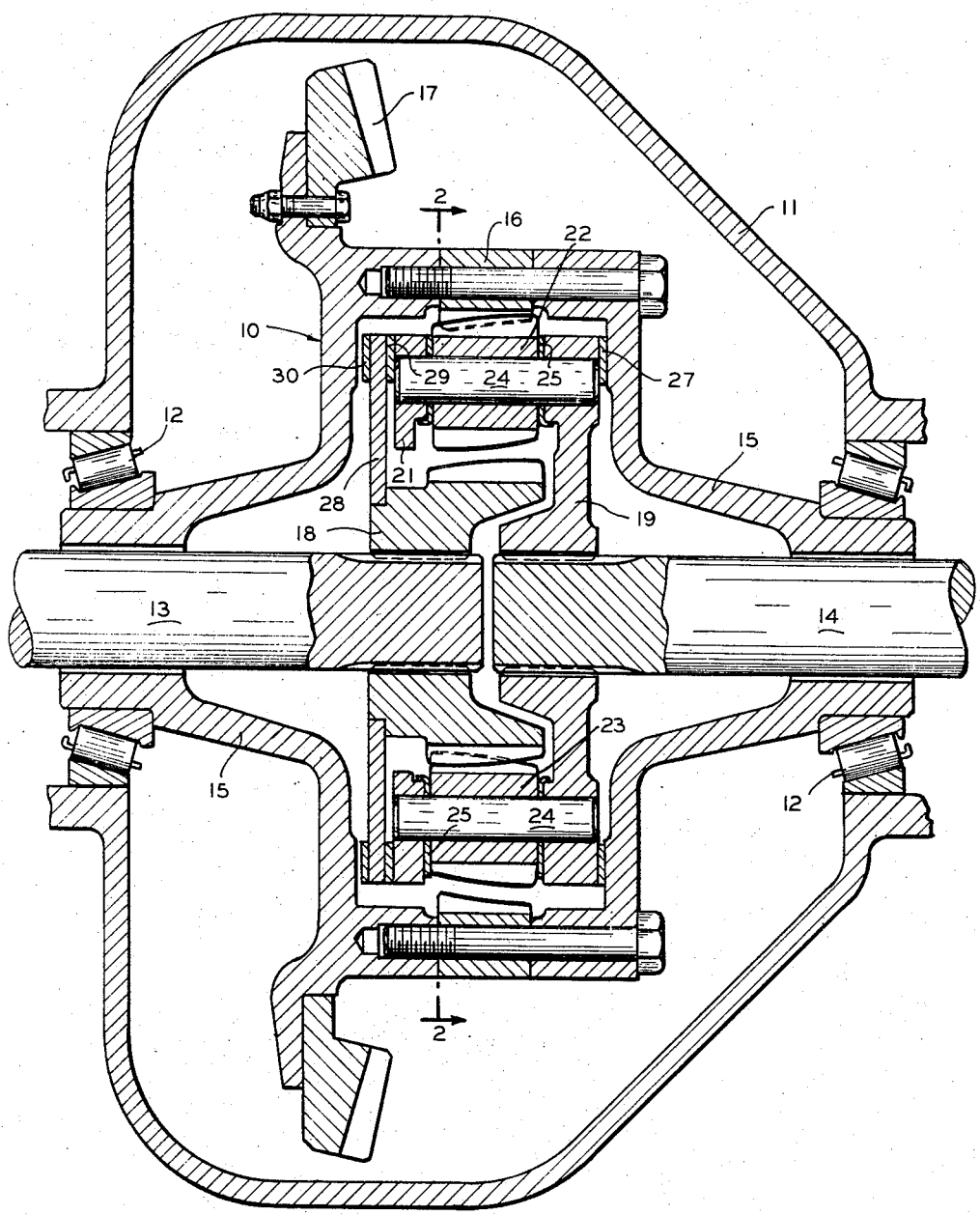
Figure 2:
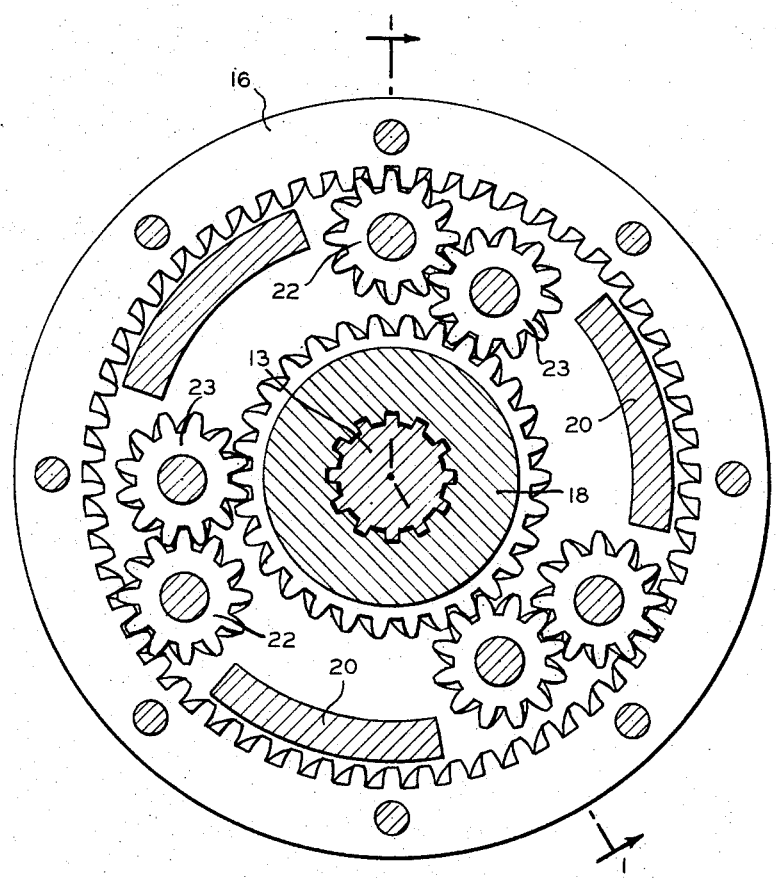

Other and further objects, advantages, and features of the invention will be apparent to those skilled in the art from the following detailed description, taken in conjunction with the accompanying drawings, in which:

FIGURE 1 is a sectional view of the interior of the casing of the differential mechanism according to the present invention, taken substantially as indicated by the line 1—1 in FIGURE 2; and FIGURE 2 is a sectional view through the differential mechanism and its housing, taken substantially as indicated by the line 2—2 of FIG. 1.

Referring to the drawings, a differential cage or casing generally indicated as 10 is shown as rotatably supported in a differential housing 11 as by means of suitable bearings 12, a pair of wheel axles or shafts 13 and 14 extending in the housing and projecting into the casing, with opposed ends adjacent each other, the casing 10 being coaxial with the shafts. Each shaft may mount a vehicle wheel on its outer portion. The cage or casing 10 comprises two generally similar hollow parts 15 disposed in opposed or facing relation, with a central annular portion between inwardly directed cylindrical flanges or portions thereof, this central portion being in the form of an internal ring gear 16. The parts 15 and gear 16 are bolted or otherwise suitably secured together to form a unitary casing. One of the casing parts 15 may be formed with a flange or similar means for attachment thereto of a bevel gear 17 for driving the casing 10 by engagement with a cooperating gear secured on the end of a drive shaft received within the housing 11, as well known in the art, such drive connection not being illustrated since it forms no part of the present invention.

The ring gear 16 is a helical gear rotatable about the common axis of the shafts 13 and 14. Within the ring gear 16 is a sun gear 18 of smaller diameter, splined on the shaft 13 so that it may move axially thereon. Similarly splined on the shaft 14 is a planetary gear carrier 19 of general cup shape, with a peripheral flange 20 extending between the ring gear 16 and sun gear 18 and having a radial lip or inbent flange 21 thereon to define a channel opening radially inwardly. In this channel are rotatably mounted a plurality of pairs of planetary gears 22 and 23, by means of shafts or pins 24 the ends of which are supported in opposed side portions of the channel. The gears of each pair mesh with each other, and each gear 22 projects through a suitable aperture in the bottom of the channel to mesh with the ring gear 16, while each planet gear 23 extends radially inwardly beyond the mouth of the channel to mesh with the sun gear 18. It will be evident that the sun gear 18 and planet gears 22 and 23 are necessarily helical, in order to cooperate properly with the helical internal gear 16. Annular wear plates 25 are disposed between opposite faces of the planetary gears and the side walls of the channel. In the present instance, three pairs of planetary gears are shown. An annular strip 27 of any suitable frictional materials, as for instance sintered bronze, is disposed between the plate or body portion of the planet carrier 19 and the inner radial face of the adjacent portion 15 of the casing 10. The friction strip 27 is secured to either of these members in any suitable manner, in slight clearance relation to the other. A radially disposed end plate 28 is welded or otherwise secured on the axially outer end of the hub of sun gear 18, and on its opposite faces adjacent its outer edge carries annular strips 29 and 30 of suitable frictional material. The strip 29 is secured on the axially inner face of the end plate 28, and is normally in slight clearance relation with the outer face of the radial flange 21 of the planet carrier 19. The strip 30 is secured on the axially outer face of the end plate, and is normally in appreciable clearance relation with the inner face of the portion 15 of the casing 10 adjacent the sun gear.

In transmission of driving torque by the gear 17, the casing 10 is rotated about the common axis of the shafts 13 and 14, the ring gear 16 driving the planet gear carrier 19 and sun gear 18 through the planetary gears 22 and 23, so that the shafts 13 and 14 are driven with substantially equal torque. The fact that the gears are helical results in development of lateral or endwise thrust forces tending to move the gears axially. In normal driving conditions, the torque is relatively low and approximately equally divided between the two shafts, and the thrust forces are therefore more or less negligible as a result of both factors, the planetary gears rotating with the sun gear and carrier about the shaft axis. In this respect, therefore, the present differential operates substantially as does a conventional differential mechanism, and also allows the differential wheel action of a conventional mechanism. It may here be explained that the thrust forces acting on the planetary gears 22 and 23 of each pair neutralize or cancel each other, since their teeth are of opposite hands, so that there is no tendency for the planetary gears to shift axially at any time.

Similarly, due to the gear arrangement, the sun gear 18 and ring gear 16 develop thrust in opposing directions. While the helical teeth on these two gears are of the same hand, the effect is of opposite hands because one is an internal and the other an external gear. The ring gear 16, of course, cannot shift axially, because it is part of the casing 10, any thrust of which is taken by the bearings 12. As already noted, the planetary gears do not have any axial thrust, so that the sun gear 18 is the thrust-applying part. If the transmitted torque rises appreciably, as by the wheel on one of the shafts losing traction relative to the other, the sun gear 18 is moved axially to move the end plate in one axial direction or the other, causing a frictional clutching engagement between the parts of the mechanism which increases progressively with increase in torque, to the point where the differential is locked.

Assuming that the casing 10 as viewed in FIG. 1 is rotating in a direction to bring its upper portion outwardly from the plane of the drawing, or clockwise as viewed in FIG. 2, at relatively high torque, the sun gear 18 would be forced to the left as viewed in FIG. 1 by the lateral thrust developed by the helical gears, shifting the end plate 28 so as to bring the frictional strip 30 into clutching engagement with the inner wall of the casing 10, and if the torque is high enough, with sufficiently tight engagement to lock the ring gear to the casing, and thus lock the mechanism. Both shafts 13 and 14 would thus be rotated at the same speed, and power would be delivered to the wheel having traction. If the casing 10 rotated in the opposite direction, the sun gear 18 would move to the right as viewed in FIG. 1, bringing the frictional strip 29 into engagement with the inbent flange 21 of the carrier 19, and tending to clutch the sun gear 18 to the carrier 19, as well as shifting the carrier 19 to the right for frictional engagement through the frictional strip 27 with the inner face of the casing 10 adjacent the carrier. If the torque is high enough, the sun gear 18 is locked to the carrier 19, and the carrier 19 is locked to the casing 10, so that the differential mechanism is locked and both shafts 13 and 14 are rotated at the same speed. The annular strips 28, 29 and 30, it will be evident, serve as clutch members.

The provision of the frictional strip 29 on the axially inner face of the plate 29 permits of variation in the proportion between input torque and the locking bias in opposite directions of rotation of the differential casing, which is advantageous under certain conditions of operation. The strip 29 may if desired be omitted to eliminate its clutching action, and the end plate 28 arranged for substantially frictionless engagement with the inbent flange 21 to shift the carrier 19 for frictional clutching by the strip 27, upon movement of the sun gear 18 to the right. On the other hand, it will be appreciated that the principle illustrated by use of the clutch strip 29 may be extended by the provision of additional frictional strips in such location and arrangement relative to the parts of the differential mechanism as to provide for other variations between the locking bias in differing directions of rotation of the differential casing or different values of transmitted torque.

The invention is not limited to the particular embodiment herein disclosed, which is exemplary and not exhaustive.

I claim:

1. A limited slip differential mechanism comprising a pair of aligned shafts with opposed ends in adjacency, an internal gear coaxial with said shafts, means supporting said internal gear for rotation and fixed thereto, a sun gear within the internal gear splined on one of said shafts, a planet gear carrier splined on the other shaft, a plurality of pairs of planetary gears mounted on said carrier extending between the internal gear and sun gear, the gears of each pair meshing with each other and one also meshing with the sun gear and the other with the internal gear, all of said gears being helical gears, first clutch means fixed on the sun gear disposed adjacent said supporting means, and second clutch means disposed between the carrier and the supporting means and fixed on one thereof.

2. A differential mechanism as defined in claim 1, in which said supporting means comprise a casing enclosing said gears, carrier, and clutch means.

3. A differential mechanism as defined in claim 1, including at least one additional clutch means.

4. A differential mechanism as defined in claim 3, in which said additional clutch means comprise third clutch means fixed on the sun gear adjacent the carrier.

5. A differential mechanism as defined in claim 3, in which said supporting means comprises a casing enclosing said gears, carrier, and clutch means.

References Cited

UNITED STATES PATENTS

| | | | |
|---|---|---|---|
| 1,481,889 | 1/1924 | Carhart | 74—710.5 |
| 2,178,613 | 11/1939 | Seeck. | |
| 2,762,240 | 9/1956 | Eckert. | |
| 2,836,084 | 5/1958 | Lance. | |
| 2,918,831 | 12/1959 | Wildhaber | 74—710.5 |
| 2,947,200 | 8/1960 | Stump. | |
| 2,972,265 | 2/1961 | Walter | 74—711 |
| 3,053,114 | 9/1962 | Singer | 74—711 |
| 3,060,765 | 10/1962 | Rinsoz. | |
| 3,253,483 | 5/1966 | McCaw | 74—711 |
| 3,264,901 | 8/1966 | Ferbitz et al. | 74—711 |
| 3,292,456 | 12/1966 | Saari | 74—711 |
| 3,313,180 | 4/1967 | Balfour et al. | 74—711 |

DONLEY J. STOCKING, *Primary Examiner.*

L. H. GERIN, *Assistant Examiner.*